Figure 1:
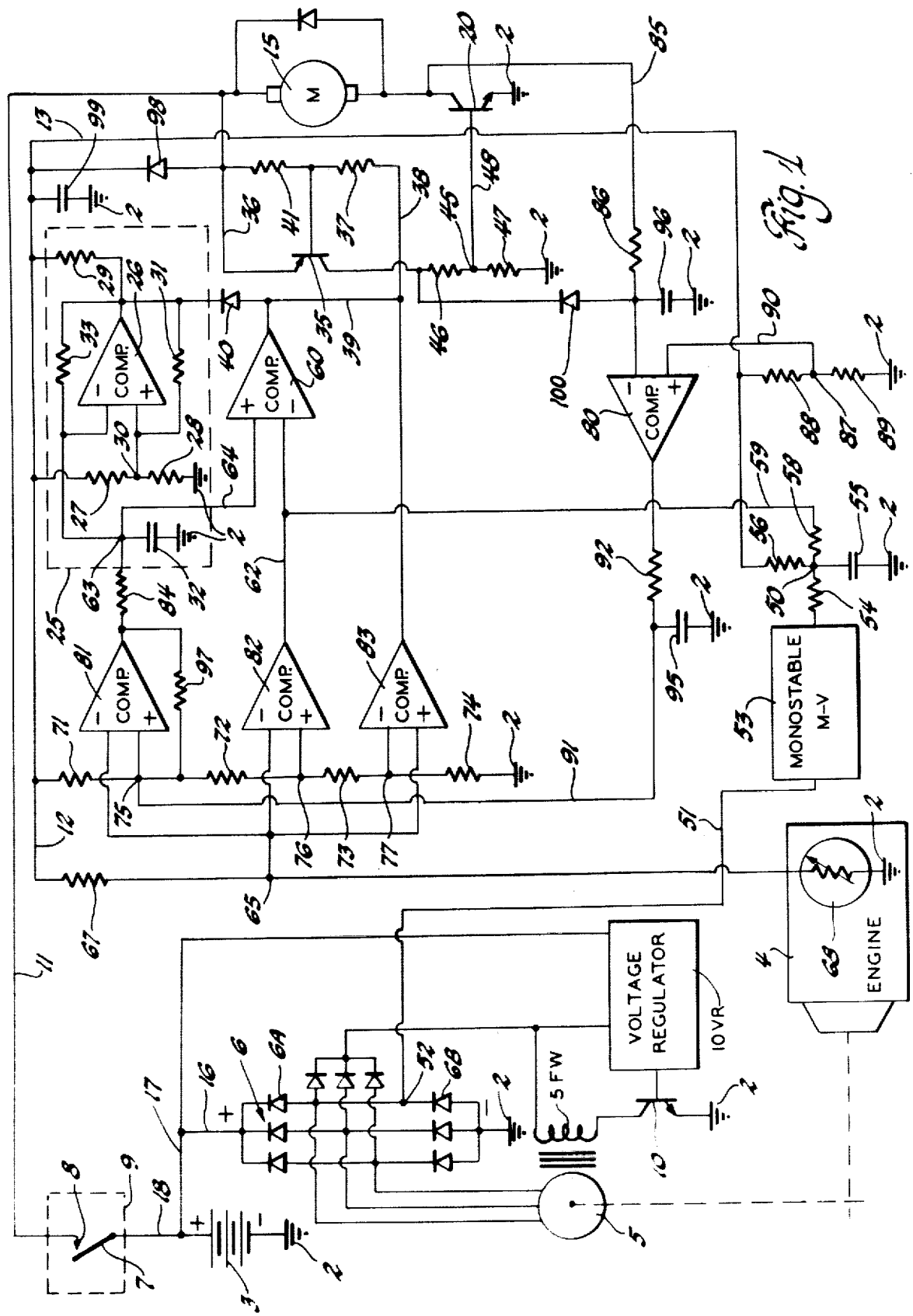

United States Patent [19]

Lehnhoff et al.

[11] 4,313,402
[45] Feb. 2, 1982

[54] INTERNAL COMBUSTION ENGINE RADIATOR COOLING FAN DRIVE MOTOR CONTROL SYSTEM

[75] Inventors: Richard N. Lehnhoff, Kettering; William C. Staker, Springfield, both of Ohio

[73] Assignee: General Motors Corporation, Detroit, Mich.

[21] Appl. No.: 98,800

[22] Filed: Nov. 30, 1979

[51] Int. Cl.³ .............................................. F01P 7/02
[52] U.S. Cl. ............................ 123/41.12; 123/41.49; 62/323.3; 318/471
[58] Field of Search ............... 123/41.11, 41.12, 41.02, 123/41.49; 290/40 R; 318/471, 473; 322/22, 33, 34; 62/134, 243, 323 B

[56] References Cited

U.S. PATENT DOCUMENTS

| | | | |
|---|---|---|---|
| 2,505,597 | 4/1950 | Weiser | 123/41.12 |
| 2,557,298 | 6/1951 | Leece et al. | 62/134 |
| 3,621,822 | 11/1971 | Oster | 123/41.12 |
| 3,724,230 | 4/1973 | Muto et al. | 62/323 B |
| 3,794,896 | 2/1974 | Holt | 318/471 |
| 4,168,456 | 9/1979 | Isobe | 318/471 |

Primary Examiner—Craig R. Feinberg
Assistant Examiner—W. Wolfe
Attorney, Agent, or Firm—Richard G. Stahr

[57] ABSTRACT

The electric drive motor of an internal combustion engine radiator cooling fan that is arranged to be energized by the output potential of a dynamoelectric generator driven by the engine is supplied with operating potential in such a manner that the average supplied drive motor power is directly proportional to engine speed while engine temperature is within the range between a predetermined first temperature and a predetermined higher second temperature and the engine is operating within a selected speed range.

5 Claims, 4 Drawing Figures

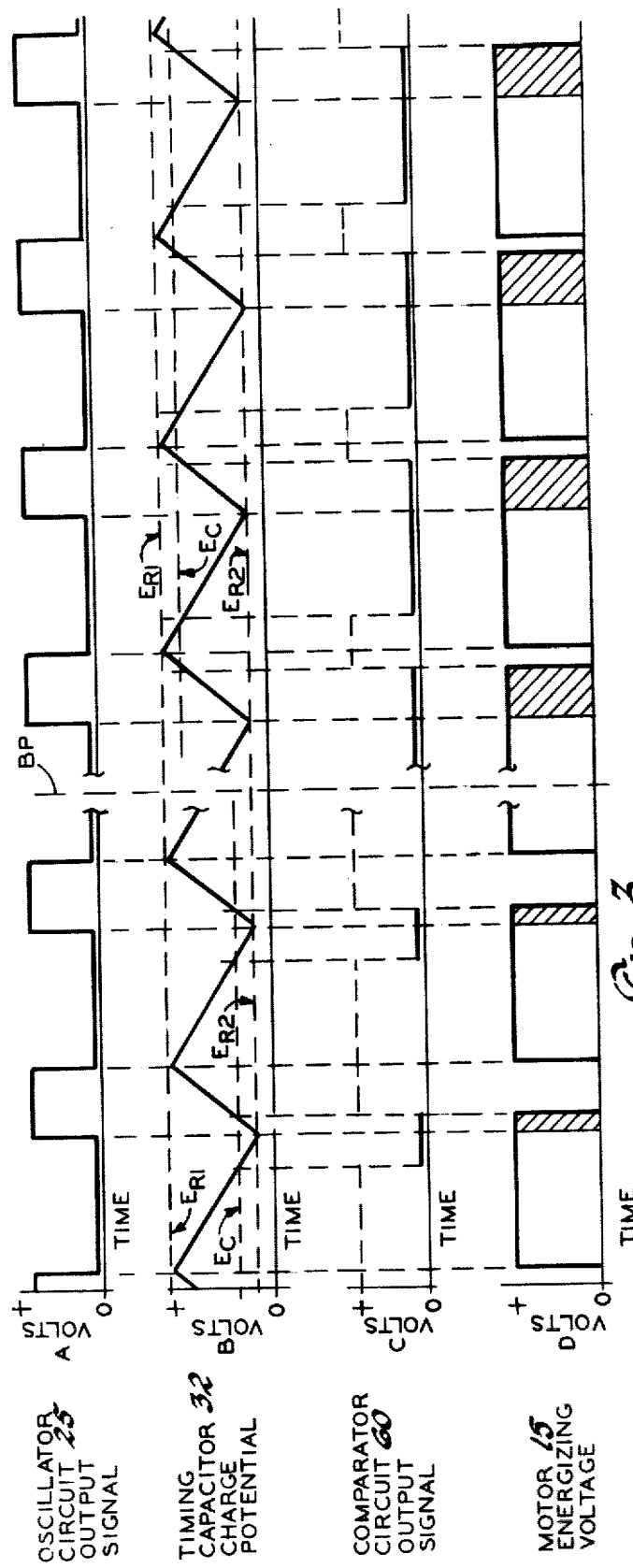

1

INTERNAL COMBUSTION ENGINE RADIATOR COOLING FAN DRIVE MOTOR CONTROL SYSTEM

This invention is directed to an internal combustion engine radiator cooling fan drive motor control system and, more specifically, to a system of this type that controls the fan drive motor energization in such a manner that the average power supplied to the fan drive motor is directly proportional to engine speed while the engine temperature is within the range between a predetermined first temperature and a predetermined higher second temperature and the engine is operating within a selected speed range.

It has been found that an electric motor driven internal combustion engine radiator cooling fan is a very desirable arrangement for cooling motor vehicles with transversely mounted engines. However, it has also been found that the power requirements of radiator cooling fan drive motors tend to at least seriously burden and may even exceed the capacity of the vehicle battery charging system. As a result, the battery may become discharged during vehicle operation. With charging systems employing engine driven dynamoelectric generators, the output capacity of the dynamoelectric generator is a function of engine speed. At idle speeds, the output capacity of the dynamoelectric generator is critical, however, more output capacity is available as engine speed is increased. Therefore, the provision of an internal combustion engine radiator cooling fan drive motor control system that is operative in such a manner that the average supplied drive motor power is directly proportional to engine speed while the engine temperature is within the range between a predetermined first temperature and a second predetermined higher temperature and the engine is operating within a selected speed range is desirable.

It is, therefore, an object of this invention to provide an improved internal combustion engine radiator cooling fan drive motor control system.

It is another object of this invention to provide an improved internal combustion engine radiator cooling fan drive motor control system that supplies drive motor power directly with engine speed.

It is a further object of this invention to provide an improved internal combustion engine radiator cooling fan drive motor control system that supplies fan drive motor power directly with engine speed while the engine temperature is within a range between a predetermined first temperature and a predetermined higher second temperature and the engine is operating within a selected speed range.

In accordance with this invention, an internal combustion engine radiator cooling fan drive motor control system is provided wherein the average power supplied to the fan drive motor is directly proportional to engine speed while the engine temperature is within the range between a predetermined first temperature and a predetermined higher second temperature and the engine is operating within a selected speed range.

For a better understanding of the present invention, together with additional objects, advantages and features thereof, reference is made to the following description and accompanying drawing in which:

FIG. 1 sets forth the internal combustion engine radiator coolin fan drive motor control system of this invention partially in schematic and partially in block form;

2

FIG. 2 is a curve showing the charging system dynamoelectric generator output power available to drive an engine radiator cooling fan drive motor over a range of engine speeds; and FIGS. 3 and 4 are respective curves useful in understanding the operation of the circuit of FIG. 1.

The internal combustion engine radiator cooling fan drive motor control system of this invention employs six conventional voltage comparator circuits and a conventional monostable multivibrator circuit. As these circuit elements may be commercially available items well known in the art and, per se, form no part of this invention, each has been illustrated in block form in FIG. 1. Furthermore, these devices are only examples of circuit elements suitable for use with the system of this invention, consequently, there is no intention or inference of a limitation thereto as other circuit elements having similar electrical characteristics may be substituted therefor without departing from the spirit of the invention. The conventional voltage comparator circuits may be of the type marketed by the National Semiconductor Corporation of Santa Clara, Calif. under the designation LM2901 and the conventional monostable multivibrator circuit may be of the type marketed by the RCA Corporation of Somerville, N.J. under the designation CD4098BE.

In accordance with logic terminology well known in the art, throughout this specification logic signals will be referred to as "High" or logic 1 and "Low" or logic 0 signals. For purposes of this specification and without intention or inference of a limitation thereto, the "High" or logic 1 signals will be considered to be of a positive polarity potential and the "Low" or logic 0 signals will be considered to be of zero or ground potential.

As point of reference or ground potential is the same point electrically throughout the system, it has been represented in FIG. 1 of the drawing by the accepted schematic symbol and referenced by the numeral 2.

In FIG. 1 of the drawing, the internal combustion engine radiator cooling fan drive motor control system of this invention is set forth partially in schematic and partially in block form in combination with an operating potential source, which may be a conventional automotive type storage battery 3, and an internal combustion engine 4.

Engine 4 is arranged to drive a conventional automotive type alternator 5 in a manner well known in the art. The three-phase output potential of alternator 5 is rectified by a conventional six-diode bridge type full-wave rectifier circuit 6 having a positive polarity output terminal connected to the positive polarity output terminal of battery 3 and a negative polarity output terminal connected to point of reference or ground potential 2.

The positive polarity output terminal of battery 3 is conneced to the movable contact 7 of a conventional electrical switch 9 having in addition to movable contact 7 a stationary contact 8. Movable contacts 7 and 8 of switch 9 may be the well known normally open "ignition" circuit contacts of a conventional automotive type ignition switch.

In the interest of reducing drawing complexity, specific operating potential connections to the various circuit elements of FIG. 1 have not been shown. It is to be specifically understood, however, that upon the closure of movable contact 7 of switch 9 to stationary contact 8, operating potential is supplied to the various circuit elements of FIG. 1 as required. Associated with rectifier circuit 6 is a diode trio which provides the energizing current for alternator field winding 5FW through the current carrying electrodes of an NPN switching transistor 10 while this device is in the conductive mode. In a manner well known in the automotive art, NPN switching transistor 10 is rendered conductive and not conductive as the charging system output potential falls below and increases above a predetermined charge potential, respectively, by the operation of a voltage regulator circuit. As voltage regulator circuits are well known in the art and since the voltage regulator, per se, forms no part of this invention, it is represented in FIG. 1 in block form and referenced by the designation 10VR. A suitable voltage regulator for use with this invention is disclosed and described in U.S. Pat. No. 4,137,885, Van Ostrom, that issued Feb. 6, 1979 and is assigned to the same assignee as is this invention.

Upon the operation of movable contact 7 of switch 9 into electrical circuit closing engagement with stationary contact 8, battery 3 potential appears across positive polarity potential leads 11, 12 and 13 and is of a positive polarity upon these leads with respect to point of reference or ground potential 2.

In FIG. 2, the output power in watts of a typical engine driven dynamoelectric generator that is available to drive an engine radiator cooling fan drive motor is plotted against engine speed in RPM. At idle and low engine speeds up to the order of 725 RPM, the available power is low and is substantially constant. As the engine speed increases from a speed of the order of 725 RPM to the order of 3625 RPM, the available dynamoelectric generator output power available to drive a radiator cooling fan drive motor increases along the indicated curve. The purpose of the internal combustion engine radiator cooling fan drive motor control system of this invention is to limit the amount of voltage supplied to the drive motor as a function of engine speed whereby the power supplied to the radiator cooling fan drive motor substantially follows but does not exceed that of the curve of FIG. 2 as the engine speed increases from the order of 725 RPM to 3625 RPM, as indicated by the curve of FIG. 4.

As the output potential of alternator 5 suppliesoperating potential to radiator cooling fan drive motor 15 through an energizing circuit that may be traced from the positive polarity output terminal of rectifier circuit 6, through leads 16, 17 and 18, the movable and stationary contacts 7 and 8 of switch 9 when closed, positive polarity potential lead 11, motor 15, the current carrying elements of the fan drive motor 15 energizing circuit NPN switching transistor 20 and point of reference or ground potential 2 to the negative polarity output terminal of rectifier circuit 6.

In a manner to be explained in detail later in this specification, the internal combustion engine radiator cooling fan drive motor control system of this invention is adaptable for use with a direct current generating system including a dyanmoelectric generator driven by the engine and is operative to maintain the fan drive motor deenergized while the engine temperature is less than a predetermined first value, to effect fan drive motor energization in such a manner that the average supplied fan drive motor power is directly proportional to engine speed while the engine temperature is within a range between the predetermined first value and a predetermined higher second value and the engine is operating within a selected speed range and to maintain the fan drive motor continuously energized at all engine speeds while the engine temperature is higher than the predetermined second value.

With regard to the National Semiconductor type LM2901 voltage comparator circuits employed in an actual embodiment of the system of this invention, the output terminal of each is the uncommitted collector electrode of a grounded emitter NPN transistor. While the potential level of the signal applied to the plus (+) input terminal of this type comparator circuit is greater than that of the signal applied to the minus (−) input terminal, the NPN output transistor is not conductive and while the potential level of the signal applied to the plus (+) input terminal is less than that of the signal applied to the minus (−) input terminal, the NPN output transistor is conductive. Consequently, unless the output terminal of this type of comparator circuit is connected to a positive polarity potential source through a pull-up resistor, the output terminal is an open circuit when the potential level of the signal applied to the plus (+) input terminal is substantially equal to or higher than that of the signal applied to the minus (−) input terminal and the output terminal is substantially ground potential when the potential level of the signal applied to the plus (+) input terminal is less than that of the signal applied to the minus (−) input terminal.

The circuitry contained within dashed line rectangle 25 is a free-running oscillator circuit. Considering only the circuitry within dashed line rectangle 25 and assuming that the NPN output transistor of comparator circuit 26 is not conductive, the potential level of the reference potential signal $E_{R1}$ upon junction 30 between series resistors 27 and 28 is determined by the parallel combination of series connected resistors 29 and 31 and resistor 27 in series with resistor 28 and timing capacitor 32 charges across the supply potential source through series resistors 29 and 33. When the charge upon timing capacitor 32 attains a potential level substantially equal to that of the reference potential signal $E_{R1}$ upon junction 30, NPN output transistor of comparator circuit 26 is rendered conductive to place the output terminal of comparator circuit 26 at substantially ground potential. At this time, the potential level of the reference potential signal $E_{R2}$ upon junction 30 is determined by resistor 27 in series with the parallel combination of resistors 28 and 31, consequently, the potential level of the reference potential signal $E_{R2}$ is of a lower value than that of the reference potential signal $E_{R1}$ as indicated by curve B of FIG. 3. At this time, timing capacitor 32 discharges through resistor 33 and the conducting NPN output transistor of comparator circuit 26. When the charge upon timing capacitor 32 attains a potential level substantially equal to that of the refernce potential signal $E_{R2}$ upon junction 30, NPN output transistor of comparator circuit 26 is rendered not conductive. At this time, the cycle as hereinabove described repeats so long as operating potential is supplied.

As indicated by curves A and B of FIG. 3, when timing capacitor 32 has become charged to a potential level substantially equal to that of the reference potential signal $E_{R1}$ upon junction 30, the NPN output transistor of comparator circuit 26 is rendered conductive to place the output terminal of comparator circuit 26 at substantially ground potential. While timing capacitor 32 is discharging through resistor 33 and the conducting NPN output transistor of comparator circuit 26, the signal upon the output terminal of comparator circuit 26 remains at substantially ground potential. When timing capacitor 32 has discharged to a potential level substantially equal to that of the reference potential signal $E_{R2}$ upon junction 30, the NPN output transistor of comparator circuit 26 is rendered not conductive to place the output terminal of comparator circuit 26 at substantially supply potential. This cycle repeats so long as oscillator circuit 25 remains oscillating. In the actual embodiment, oscillator circuit 25 is designed to have an operating frequency of the order of 1250 hertz per second. By proportioning the ohmic value of resistors 27, 28 and 31 relative to each other, the duty cycle, the period of time during which the NPN output transistor of comparator circuit 26 is conductive, may be selected. In the actual embodiment, oscillator circuit 25 was designed to have a two-thirds duty cycle. That is, the output terminal of comparator circuit 26 is of a substantially ground potential during two-thirds of each cycle of oscillator circuit 25.

While the NPN output transistor of comparator circuit 26 is conductive for two-thirds of each oscillator circuit 25 cycle to place the output terminal of comparator circuit 26 at substantially ground potential, emitter-base drive current is supplied to PNP control transistor 35 through a circuit that may be traced from positive polarity potential lead 11, through lead 36, the emitter-base electrodes of PNP control transistor 35, resistor 37, leads 38 and 39, diode 40, the conducting NPN output transistor of comparator circuit 26 and point of reference or ground potential 2 to the negative polarity output terminal of rectifier circuit 6. Resistor 41 is an emitter-base bias resistor for PNP control transistor 35. This emitter-base drive current renders PNP control transistor 35 conductive through the emitter-collector electrodes thereof to supply current through series resistors 46 and 47. As the base electrode of the fan drive motor 15 energizing circuit NPN switching transistor 20 is connected to junction 45 between series resistors 46 and 47, base-emitter drive current is supplied to NPN switching transistor 20 through a circuit that may be traced from positive polarity potential lead 11, through the emitter-collector electrodes of conducting NPN control transistor 35, resistor 46 and lead 48 to render NPN switching transistor 20 conductive through the collector-emitter electrodes thereof. Conducting NPN switching transistor 20 completes the previously described radiator cooling fan drive motor 15 energizing circuit as indicated by curve D of FIG. 3. While the NPN output transistor of comparator circuit 26 is not conductive for one-third of each oscillator circuit 25 cycle to place the output terminal of comparator circuit 26 at substantially supply potential, diode 40 is reverse biased. Upon diode 40 becoming reverse biased, the previously described circuit through which emitter-base drive current is supplied to PNP control transistor 35 is interrupted to render this device not conductive. Upon PNP control transistor 35 going not conductive, base-emitter drive current is no longer supplied to NPN switching transistor 20, consequently, this device is rendered not conductive to interrupt the previously described fan drive motor 15 energizing circuit, as indicated by those pulses of curve D of FIG. 3 that are not cross-hatched. Considering only oscillator circuit 25, PNP control transistor 35 and NPN switching transistor 20, therefore, these circuit elements are operative to effect the periodic energization and deenergization of the radiator cooling fan drive motor 15 at a predetermined frequency and in such a manner that the ratio of the period of energization to the period of deenergization provides a predetermined drive motor energization duty cycle. In the actual embodiment, this duty cycle is two-thirds.

To produce a signal of a magnitude directly proportional to engine speed, the input terminal of a conventional monostable multivibrator circuit 53 is connected through lead 51 to junction 52 between diodes 6A and 6B of rectifier circuit 6. The signal upon junction 52 is the half-wave rectified potential of one phase of alternator 5, consequently, a series of alternating current half-wave rectified direct current potential pulses appears upon junction 52 of a frequency proportional to engine speed, as is well known in the automotive art. Each of these potential pulses is effective to trigger monostable multivibrator circuit 53 to the alternate state in which a logic 1 signal is present upon the output terminal thereof. The series of logic 1 output signals of monostable multivibrator circuit 53 is integrated by the combination of resistor 54 and integrating capacitor 55 to produce an engine speed potential signal upon junction 50 that is of a potential level magnitude directly proportional to engine speed, as is well known in the art. Resistor 56 connected across integrating capacitor 55 and positive polarity potential lead 13 offsets the voltage upon integrating capacitor 55 to the operating level of comparator circuit 60. The ohmic values of resistors 54 and 56 and the capacitance value of integrating capacitor 55 are so proportioned relative to each other that with engine speeds between idle and the selected engine speed at which there is sufficient engine driven dynamoelectric generator output power available to drive the fan drive motor 15, the potential level $E_c$ of the engine speed potential signal upon junction 50 is slightly lower than that of the reference potential signal $E_{R2}$ upon junction 30 of oscillator circuit 25. In the actual embodiment, the selected engine speed at which there is sufficient engine driven dynamoelectric generator output power available to drive the fan drive motor 15 is of the order of 725 RPM. With higher engine speeds, the potential level $E_c$ of the engine speed potential signal upon junction 50 is higher than that of the reference potential signal $E_{R2}$ by an amount directly proportional to engine speed. The engine speed potential signal upon junction 50 is applied through resistor 58 and leads 59 and 62 to the minus (−) input terminal of comparator circuit 60 and the charge upon timing capacitor 32 of oscillator circuit 25 that appears upon junction 63 is applied through lead 64 to the plus (+) input terminal of comparator circuit 60. With these signals applied to comparator circuit 60 in this manner, while the potential level of the charge upon timing capacitor 32 is greater than that of the engine speed potential signal upon junction 50, the NPN output transistor of comparator circuit 60 is rendered not conductive, therefore, since the output terminal of comparator circuit 60 is not connected to a positive polarity potential source through a pull-up resistor, the output terminal of comparator circuit 60 is an open circuit and while the potential level of the charge upon timing capacitor 32 is less than that of the engine speed potential signal upon junction 50, the NPN output transistor of comparator circuit 60 is rendered conductive to place the output terminal of comparator circuit 60 at substantially ground potential. In curve C of FIG. 3, the open circuit condition of the output terminal of comparator circuit 60 is indicated by dashed line pulses to show that should the output terminal of comparator circuit 60 be connected to a source of supply potential through a pull-up resistor, the output terminal of comparator circuit 60 would be at substantially supply potential.

The operation of that portion of the system of this invention including oscillator circuit 25, comparator circuit 60, PNP control transistor 35 and NPN switching transistor 20 will now be described with regard to two different engine speeds.

While the engine is operating at a first speed slightly greater than the selected engine speed at which there is sufficient engine driven dynamoelectric generator output power available to drive fan drive motor 15, the potential level $E_c$ of the engine speed potential signal upon junction 50 is slightly greater than that of the reference potential signal $E_{R2}$ upon junction 30 of oscillator circuit 25, as indicated by that portion of curve B of FIG. 3 to the left of the break point BP. When the charge upon timing capacitor 32 of oscillator circuit 25 during a charge cycle has attained a potential level substantially equal to that of the reference potential signal $E_{R1}$ upon junction 30, as indicated by curve B of FIG. 3, the NPN output transistor of comparator circuit 26 is rendered conductive to place the output terminal of comparator circuit 26 at substantially ground potential, as indicated by curve A of FIG. 3. Upon the output terminal of comparator circuit 26 going to substantially ground potential, the previously described energizing circuit for fan drive motor 15 is completed in a manner previously explained, as indicated by curve D of FIG. 3, and timing capacitor 32 begins to discharge through resistor 33 and the conducting NPN output transistor of comparator circuit 26, as indicated by curve B of FIG. 3. When the charge upon timing capacitor 32 during a discharge cycle has attained a potential level substantially equal to the potential level $E_c$ of the engine speed potential signal upon junction 50, the NPN output transistor of comparator circuit 60 is rendered conductive to place the output terminal of comparator circuit 60 at substantially ground potential, as indicated by curve C of FIG. 3. When the charge upon timing capacitor 32 at the end of a discharge cycle has attained a potential level substantially equal to that of the reference potential signal $E_{R2}$ upon junction 30, the NPN output transistor of comparator circuit 26 is rendered not conductive to place the output terminal of comparator circuit 26 at substantially supply potential, as indicated by curve A of FIG. 3, and timing capacitor 32 begins to charge as indicated by curve B of FIG. 3. However, as the NPN output transistor of comparator circuit 60 is conductive at this time to place the output terminal of comparator circuit 60 at substantially ground potential, as indicated by curve C of FIG. 3, the previously described circuit through which emitter-base drive current is supplied to PNP control transistor 35 is sustained through the conducting NPN output transistor of comparator circuit 60. As a consequence, PNP control transistor 35 and NPN switching transistor 20 are maintained conductive to maintain the previously described fan drive motor 15 energizing circuit. When the charge upon timing capacitor 32 has attained a potential level substantially equal to the potential level $E_c$ of the engine speed signal upon junction 50, the NPN output transistor of comparator circuit 60 is rendered not conductive, consequently, the output terminal of comparator circuit 60 is an open circuit. This open circuit interrupts the previously described circuit through which emitter-base drive current is supplied to PNP control transistor 35, consequently, this device is rendered not conductive. Upon PNP control transistor 35 going not conductive, the previously described circuit through which base-emitter drive current is supplied to NPN switching transistor 20 is interrupted to render NPN switching transistor 20 not conductive. Upon NPN switching transistor 20 going not conductive, the previously described energizing circuit for fan drive motor 15 is interrupted, as indicated by curve D of FIG. 3. Also as shown by curve D of FIG. 3, the period that fan drive motor 15 remains energized after the NPN output transistor of comparator circuit 26 of oscillator circuit 25 was rendered not conductive to place the output terminal of comparator circuit 26 at substantially supply potential, as indicated by curve A of FIG. 3, is extended by an amount as shown by the cross-hatched portion of the pulses of curve D to the left of the break point BP.

While the engine is operating at a second speed much greater than the selected engine speed at which there is sufficient engine drive dynamoelectric generator output power available to drive fan drive motor 15, the potential level $E_c$ of the engine speed signal upon junction 50 is much greater than that of the reference potential signal $E_{R2}$ upon junction 30 of oscillator circuit 25, as indicated by that portion of curve B of FIG. 3 to the right of the break point BP. When the charge upon timing capacitor 32 of oscillator circuit 25 during a charge cycle has attained a potential level substantially equal to that of the reference potential signal $E_{R1}$ upon junction 30, as indicated by curve B of FIG. 3, the NPN output transistor of comparator circuit 26 is rendered conductive to place the output terminal of comparator circuit 26 at substantially ground potential, as indicated by curve A of FIG. 3. Upon the output terminal of comparator circuit 26 going to substantially ground potential, the previously described energizing circuit for fan drive motor 15 is completed in a manner previously explained, as indicated by curve D of FIG. 3, and timing capacitor 32 begins to discharge through resistor 33 and the conducting NPN output transistor of comparator circuit 26, as indicated by curve B of FIG. 3. When the charge upon timing capacitor 32 during a discharge cycle has attained a potential level substantially equal to the potential level $E_c$ of the engine speed potential signal upon junction 50, the NPN output transistor of comparator circuit 60 is rendered conductive to place the output terminal of comparator circuit 60 at substantially ground potential, as indicated by curve C of FIG. 3. When the charge upon timing capacitor 32 at the end of a discharge cycle has attained a potential level substantially equal to that of the reference potential signal $E_{R2}$ upon junction 30, the NPN output transistor of comparator circuit 26 is rendered not conductive to place the output terminal of comparator circuit 26 at substantially supply potential, as indicated by curve A of FIG. 3, and timing capacitor 32 begins to charge as indicated by curve B of FIG. 3. However, as the NPN output transistor of comparator circuit 60 is conductive at this time to place the output terminal of comparator circuit 60 at substantially ground potential, as indicated by curve C of FIG. 3, the previously described circuit through which emitter-base drive current is supplied to PNP control transistor 35 is sustained through the conducting NPN output transistor of comparator circuit 60. As a consequence, PNP control transistor 35 and NPN switching transistor 20 are maintained conductive to maintain the previously described fan drive motor 15 energizing circuit. When the charge upon charging timing capacitor 32 has attained a potential level substantially equal to the potential level $E_c$ of the engine speed signal upon junction 50, the NPN output transistor of comparator circuit 60 is rendered not conductive, consequently, the output terminal of comparator circuit 60 is an open circuit. This open circuit interrupts the previously described circuit through which emitter-base drive current is supplied to PNP control transistor 35, consequently, this device is rendered not conductive. Upon PNP control transistor 35 going not conductive, the previously described circuit through which base-emitter drive current is supplied to NPN switching transistor 20 is interrupted to render NPN switching transistor 20 not conductive. Upon NPN switching transistor 20 going not conductive, the previously described energizing circuit for fan drive motor 15 is interrupted, as indicated by curve D of FIG. 3. Also as shown by curve D of FIG. 3, the period that fan drive motor 15 remains energized after the NPN output transistor of comparator circuit 26 of oscillator circuit 25 was rendered not conductive to place the output terminal of comparator circuit 26 at substantially supply potential as indicated by curve A of FIG. 3 is extended by an amount as shown by the cross-hatched portion of the pulses of curve D to the right of break point BP. As indicated by this curve, the period of time that the energization of fan drive motor 15 is extended is greater at this greater engine speed. Consequently, comparator circuit 60 is responsive to the engine speed potential signal upon junction 50 that is proportional to engine speed for extending the fan drive motor 15 energizing duty cycle by an amount directly proportional to engine speed.

To maintain the fan drive motor deenergized while the engine temperature is less than a predetermined first value, to effect fan drive motor energization in such a manner that the average supplied fan drive motor power is directly proportional to engine speed while the engine temperature is within a range between the predetermined first value and a predetermined higher second value and to maintain the fan drive motor continuously energized at all engine speeds while the engine temperature is higher than the predetermined second value, the circuitry now to be described is operative to disable oscillator circuit 25 with engine temperatures less than the predetermined first value, in the actual embodiment of the order of 180° F.; to enable comparator circuit 60 with engine temperatures within a range between the predetermined first value and the predetermined higher second value, of the order of 220° F. in the actual embodiment, and to override the operation of oscillator circuit 25 and comparator circuit 60 with engine temperatures greater than the predetermined second value.

Connected in series across positive polarity potential lead 12 and point of reference or ground potential 2 is a resistor 67 and a negative temperature coefficient thermistor 68 that is mounted upon engine 4 in such a manner as to sense engine temperature. As thermistor 68 is of the negative temperature coefficient type, as the temperature of engine 4 increases and decreases, the ohmic value of thermistor 68 decreases and increases, respectively. Consequently, as engine temperature changes, an engine temperature signal of a potential level indicative of engine temperature appears upon junction 65 between resistor 67 and thermistor 68 and is of a positive polarity with respect to point of reference or ground potential 2. Also connected in series across positive polarity potential lead 12 and point of reference or ground potential 2 is a voltage divider network including series connected resistors 71, 72, 73 and 74. As the junction 65 between resistor 67 and thermistor 68 is connected to the minus (−) input terminal of each of comparator circuits 81 and 82 and to the plus (+) input terminal of comparator circuit 83, the engine temperature signal is applied as an input signal to these comparator circuits. Junction 75 between series resistors 71 and 72 is connected to the plus (+) input terminal of comparator circuit 81, junction 76 between series resistors 72 and 73 is connected to the plus (+) input terminal of comparator circuit 82 and junction 77 between resistors 73 and 74 is connected to the minus (−) input terminal of comparator circuit 83. The ohmic value of each of series resistors 71, 72, 73 and 74 is proportioned relative to the ohmic value of each other in such a manner that the potential level upon junction 75 is substantially equal to that of the engine temperature signal with an engine temperature of the predetermined first value, of the order of 180° F. in the actual embodiment; the potential level upon junction 76 is substantially equal to that of the engine temperature signal with an engine temperature of a predetermined intermediate third value, of the order of 220° F. in the actual embodiment; and the potential level upon junction 77 is substantially equal to that of the engine temperature signal with an engine temperature of the predetermined higher second value, of the order of 245° F. in the actual embodiment, all with respect to point of reference or ground potential 2.

With engine temperatures lower than the predetermined first value, the potential level of the engine temperature signal upon junction 65 is higher than that of the signal upon each of junctions 75, 76 and 77. As the potential level of the engine temperature signal applied to the minus (−) input terminal of each of comparator circuits 81 and 82 is higher than that of the respective signals upon junctions 75 and 76 that are applied to the respective plus (+) input terminals of comparator circuits 81 and 82, the NPN output transistor of each of these comparator circuits is rendered conductive to place the output terminal of both of these comparator circuits at substantially ground potential and as the potential level of the engine temperature signal applied to the plus (+) input terminal of comparator circuit 83 is higher than that of the signal upon junction 77 that is applied to the minus (−) input terminal thereof, the NPN output transistor of comparator circuit 83 is rendered not conductive. As the output terminal of comparator circuit 83 is not connected to a positive polarity potential source through a pullup resistor, the output terminal of comparator circuit 83 is an open circuit.

As engine radiator fan cooling is not required with engine temperatures less than that of the predetermined first value as determined by the associated engine cooling requirements, it is necessary that oscillator circuit 25 and comparator circuit 60 be disabled with these engine temperatures. The substantially ground potential signal upon the output terminal of comparator circuit 82 that is applied through lead 62 to the minus (−) input terminal of comparator circuit 60 is effective to render the NPN output transistor of comparator circuit 60 not conductive to place an open circuit upon the output terminal of comparator circuit 60 and the substantially ground potential signal upon the output terminal of comparator circuit 81 is effective to disable oscillator circuit 25 with engine temperatures less than the predetermined first value in a manner now to be explained. As the output terminal of comparator circuit 81 is substantially at ground potential and is connected through resistor 84 to junction 63, timing capacitor 32 is prevented from charging to a potential level equal to that of the reference potential signal $E_{R1}$ upon junction 30 to trigger comparator circuit 26 to the condition in which the NPN output transistor thereof is rendered conductive to place the output terminal of comparator circuit 26 at substantially ground potential. Therefore, the NPN output transistor of comparator circuit 26 remains not conductive to maintain the output terminal of comparator circuit 26 at substantially supply potential. As a consequence, oscillator circuit 25 is disabled and the previously described circuit through which emitter-base drive current is supplied to PNP control transistor 35 through the conducting NPN output transistor of comparator circuit 26 is maintained interrupted to maintain PNP control transistor 35 not conductive. As the NPN output transistors of respective comparator circuits 60 and 83 are not conductive at this time, the open circuit upon the output terminal of each of these comparator circuits also interrupts the circuit through which emitter-base drive current is supplied to PNP control transistor 35. As a consequence, PNP control transistor 35 is not conductive at this time. With PNP control transistor 35 not conductive, NPN switching transistor 20 is also not conductive to maintain the previously described energizing circuit for fan drive motor 15 interrupted. With engine temperatures less than the predetermined first value, of the order of 180° F. in the actual embodiment, therefore, comparator circuit 81 is effective to disable oscillator circuit 25 to thereby maintain fan drive motor 15 deenergized in response to engine temperatures less than the predetermined first value.

With engine temperatures higher than the predetermined higher second value, the potential level of the engine temperature signal upon junction 65 is less than that of the signal upon each of junctions 75, 76 and 77. As the potential level of the engine temperature signal applied to the minus (−) input terminal of each of comparator circuits 81 and 82 is less than that of the respective signals upon junctions 75 and 76 that are applied to the respective plus (+) input terminals of comparator circuits 81 and 82, the NPN output transistor of each of these comparator circuits is rendered not conductive and as the potential level of the engine temperature signal applied to the plus (+) input terminal of comparator circuit 83 is less than that of the signal upon junction 77 that is applied to the minus (−) input terminal thereof, the NPN output transistor of comparator circuit 83 is rendered conductive to place the output terminal of comparator circuit 83 at substantially ground potential. As the output terminal of each of comparator circuits 81 and 82 is not connected to a positive polarity potential source through a pull-up resistor, the output terminal of each of comparator circuits 81 and 82 is an open circuit.

As engine radiator fan cooling is required with engine temperatures greater than that of the predetermined higher second value as determined by the associated engine cooling requirements, comparator circuit 83 is effective to override oscillator circuit 25 and comparator circuit 60 with engine temperatures greater than the predetermined higher second value in a manner now to be explained. With an open circuit upon the output terminal of each of comparator circuits 81 and 82, oscillator circuit 25 and comparator circuit 60 function in a manner previously explained. With the output terminal of comparator circuit 83 at substantially ground potential, the previously described circuit through which emitter-base drive current is supplied to PNP control transistor 35 is completed through the conducting NPN output transistor of comparator circuit 83 to point of reference or ground potential 2 to render PNP control transistor continuously conductive. Therefore, the operation of oscillator circuit 25 and comparator circuit 60 is overridden. With PNP control transistor 35 conductive, NPN switching transistor 20 is also conductive in a manner previously explained to maintain the previously described energizing circuit for fan drive motor 15 completed. Consequently, with engine temperatures greater than the predetermined higher second value, of the order of 245° F. in the actual embodiment, fan drive motor 15 is maintained continuously energized at all engine speeds. The reason that drive motor 15 is maintained continuously energized at these higher engine temperatures is that greater engine cooling capacity is required. From this description, it is apparent that comparator circuit 83 is responsive to engine temperatures greater than the predetermined higher second value for overriding the effect of oscillator circuit 25 and comparator circuit 60 to maintain fan drive motor 15 continuously energized at all engine speeds.

With engine temperatures between the predetermined first value and the predetermined higher second value, of the order of 180° F. and 245° F., respectively, in the actual embodiment, it is desirable that the engine temperature be maintained at a predetermined intermediate third value, in the actual embodiment of the order of 220° F. With engine temperatures between the predetermined first value and the predetermined intermediate third value, of the order of 180° F. and 220° F., respectively, in the actual embodiment, the potential level of the engine temperature signal upon junction 65 is less than that of the signal upon junction 75 and is higher than that of the signal upon junctions 76 and 77. As the potential level of the signal upon junction 75 that is applied to the plus (+) input terminal of comparator circuit 81 is higher than that of the engine temperature signal that is applied to the minus (−) input terminal thereof, the NPN output transistor of comparator circuit 81 is rendered not conductive to place an open circuit upon the output terminal of comparator circuit 81. With an open circuit upon the output terminal of comparator circuit 81, oscillator circuit 25 is enabled to operate in a manner previously explained. As the potential level of the engine temperature signal that is applied to the plus (+) input terminal of comparator circuit 83 is higher than that of the signal upon junction 77 that is applied to the minus (−) input terminal thereof, the NPN output transistor of comparator circuit 83 is rendered not conductive to place an open circuit upon the output terminal of comparator circuit 83. As the potential level of the engine temperature signal that is applied to the minus (−) input terminal of comparator circuit 82 is higher than that of the signal upon junction 76 that is applied to the plus (+) input terminal thereof, the NPN output transistor of comparator circuit 82 is rendered conductive to place the output terminal of comparator circuit 82 at substantially ground potential. With a substantially ground potential upon the output terminal of comparator circuit 82 that is connected through lead 62 to the minus (−) input terminal of comparator circuit 60 and through leads 62 and 59 and resistor 58 to junction 50 between resistor 56 and integrating capacitor 55, a substantially ground potential is maintained upon the minus (−) input terminal of comparator circuit 60.

Consequently, comparator circuit 60 is in the operating condition in which the NPN output transistor thereof is not conductive. In a manner previously explained, with the NPN output transistor of comparator circuit 60 not conductive, the output terminal of comparator circuit 60 is an open circuit. With an open circuit upon the output terminal of comparator circuit 60, fan drive motor 15, in a manner previously explained, is energized by a predetermined drive motor energization duty cycle as determined by the duty cycle of oscillator circuit 25. With engine coolant temperatures between the predetermined intermediate third value and the predetermined second value, of the order of 220° F. and 245° F., respectively, in the actual embodiment, the potential level of the engine temperature signal upon junction 65 is lower than that of the signal upon junctions 75 and 76 and is higher than that of the signal upon junction 77. As a consequence, comparator circuits 81 and 83 are in the operating condition in which the respective NPN output transistors thereof are not conductive to place an open circuit upon the output terminal of each. As the potential level of the signal upon junction 76 that is applied to the minus (−) input terminal of comparator circuit 82 is lower than that of the engine temperature signal applied to the plus (+) input terminal thereof within the engine temperature range between the predetermined intermediate third and second values, the NPN output transistor of comparator circuit 82 is rendered not conductive to place an open circuit upon the output terminal of comparator circuit 82. With an open circuit upon the output terminal of comparator circuit 82, fan drive motor 15 is energized under the influence of oscillator circuit 25 as modified by the engine speed signal upon junction 50 in a manner previously explained. With engine temperatures within the range between the predetermined first and second values, therefore, at any engine speed, should the engine temperature increase beyond the predetermined third intermediate value, of the order of 220° F. in the actual embodiment, fan drive motor 15 is energized by a fan drive motor energization duty cycle as determined by engine speed in a manner previously explained. With the extended fan drive motor energization duty cycle as determined by engine speed, the engine temperature may be cooled below the predetermined third intermediate value. Should the engine temperature reduce below the predetermined intermediate third value, the engine temperature signal increases to a potential level greater than that of the signal upon junction 76 to trigger comparator circuit 82 to the operating condition in which the NPN output transistor thereof is rendered conductive to place the output terminal of comparator circuit 82 at substantially ground potential. With a substantially ground potential upon the output terminal of comparator circuit 82, comparator circuit 60 is disabled in a manner previously explained, consequently, the fan drive motor 15 energization duty cycle is determined by the duty cycle of oscillator circuit 25 as previously explained. Should this fan drive motor energization duty cycle be insufficient to maintain engine temperature below the predetermined intermediate third value, upon the increase of engine temperature above the predetermined third intermediate value, the engine temperature signal reduces to a potential level less than that of the signal upon junction 76 to trigger comparator circuit 82 to the operating condition in which the NPN output transistor thereof is rendered not conductive to place an open circuit on the output terminal of comparator 82. With an open circuit upon the output terminal of comparator circuit 82, the fan drive motor 15 energization duty cycle is again extended in accordance with engine speed, as previously explained. As a consequence of the action of comparator circuit 82, the engine temperature is modulated about the predetermined third intermediate value.

From this description it is apparent that:

(1) With engine temperatures less than the predetermined first value, comparator circuit 81 is effective to disable oscillator circuit 25 in a manner to maintain fan drive motor 15 deenergized;

(2) With engine temperatures greater than the predetermined second higher value, comparator circuit 83 is effective to override the operation of oscillator circuit 25 and comparator circuit 60 to maintain fan drive motor 15 continuously energized at all engine speeds; and (3) With engine temperatures within the range between the predetermined first and second values, oscillator circuit 25, comparator circuit 60 and comparator circuit 82 are responsive to the engine speed signal upon junction 50 to extend the fan drive motor 15 energization duty cycle by an amount directly proportional to engine speed within a selected engine speed range whereby the average supplied fan drive motor power is directly proportional to engine speed while the engine temperature is within the range between the predetermined first and second values and the engine is operating within the selected speed range.

Furthermore, the system of this invention operates to supply an increasing magnitude of supply voltage to fan drive motor 15 within a selected engine speed range as indicated by the curve of FIG. 4. That is, within the selected speed range, the supply voltage is limited to maintain the power supplied to fan drive motor 15 within that available from the engine driven dynamoelectric generator.

The saturation voltage of NPN switching transistor 20 is sensed and applied through lead 85 and resistor 86 to the minus (−) input terminal of comparator circuit 80 and a saturation voltage reference potential signal of a selected potential level upon junction 87 between resistors 88 and 89 connected in series across positive polarity potential lead 13 and point of reference or ground potential 2 is applied through lead 90 to the plus (+) input terminal of comparator circuit 80. If the saturation voltage of NPN switching transistor 20 exceeds the saturation voltage reference potential signal upon junction 87, comparator circuit 80 is triggered to the condition in which the NPN output transistor thereof is conductive to place the output terminal of comparator circuit 80 at substantially ground potential. As junction 75 between series resistors 71 and 72 is connected through lead 91 and resistor 92 to the output terminal of comparator circuit 80, with conditions of excessive NPN switching transistor 20 saturation voltage, the potential level of the signals upon junctions 75, 76 and 77 go to substantially ground potential. With a substantially ground potential signal upon junction 75, comparator circuit 81 is triggered to the condition in which the NPN output transistor thereof is conductive to place the output terminal of comparator circuit 81 at substantially ground potential, a condition that disables oscillator circuit 25 in a manner previously explained. With a substantially ground potential signal upon junction 76, comparator circuit 82 is triggered to the operating condition in which the NPN output transistor thereof is conductive to place the output terminal of comparator circuit 82 at substantially ground potential, a condition that disables the action of comparator circuit 60 in a manner previously explained. With a substantially ground potential signal upon junction 77, comparator circuit 83 is triggered to the condition in which the NPN output transistor thereof is rendered not conductive to place an open circuit upon the output terminal of comparator circuit 83, a condition that interrupts the circuit through which emitter-base drive current is supplied to PNP control transistor 35 to maintain fan drive motor 15 deenergized.

Capacitor 95 is a filter capacitor for the output signal of comparator circuit 80; capacitor 96 filters any spikes away from comparator circuit 80; resistor 97 provides hysteresis for comparator circuit 81; diode 98 is a blocking diode and capacitor 99 is a filter. Diode 100 is a steering diode for comparator circuit 80.

While a preferred embodiment of the present invention has been shown and described, it will be obvious to those skilled in the art that various modifications and substitutions may be made without departing from the spirit of the invention that is to be limited only within the scope of the appended claims.

The embodiments of the invention in which an exclusive property or privilege is claimed are defined as follows:

1. An internal combustion engine radiator cooling fan drive motor control circuit adaptable for use with a direct current generating system including a dynamoelectric generator driven by the engine for effecting drive motor energization in such a manner that the average supplied drive motor power is directly proportional to engine speed while the engine temperature is within a range between a predetermined first value and a predetermined higher second value and the engine is operating within a selected speed range, comprising:

means for effecting the periodic energization and deenergization of said drive motor at a predetermined frequency and in such a manner that the ratio of the period of energization to the period of deenergization provides a predetermined drive motor energization duty cycle;

means for producing a signal of a magnitude directly proportional to engine speed; and means responsive to said signal while the engine temperature is within the range between said predetermined first and second values for extending said drive motor energization duty cycle by an amount directly proportional to engine speed within a selected engine speed range whereby the average supplied drive motor power is directly proportional to engine speed while the engine temperature is within the range between the predetermined first and second values and said engine is operating within said selected speed range.

2. An internal combustion engine radiator cooling fan drive motor control circuit adaptable for use with a direct current generating system including a dynamoelectric generator driven by the engine for effecting drive motor energization in such a manner that the average supplied drive motor power is directly proportional to engine speed while the engine temperature is within a range between a predetermined first value and a predetermined higher second value and the engine is operating within a selected speed range, comprising:

energizing circuit means through which said fan drive motor may be energized by the output potential of said dynamoelectric generator;

means for effecting the periodic completion and interruption of said energizing circuit at a predetermined frequency and in such a manner that the ratio of the period of completion of said energizing circuit to the period of interruption of said energizing circuit provides a predetermined drive motor energization duty cycle;

means for producing a signal of a magnitude directly proportional to engine speed; and means responsive to said signal while the engine temperature is within the range between said predetermined first and second values for extending said drive motor energization duty cycle by an amount directly proportional to engine speed within a selected engine speed range whereby the average supplied drive motor power is directly proportional to engine speed while the engine temperature is within the range between the predetermined first and second values and said engine is operating within said selected speed range.

3. An internal combustion engine radiator cooling fan drive motor control circuit adaptable for use with a direct current generating system including a dynamoelectric generator driven by the engine for maintaining the drive motor deenergized while the engine temperature is less than a predetermined first value, for effecting drive motor energization in such a manner that the average supplied drive motor power is directly proportional to engine speed while the engine temperature is within a range between the predetermined first value and a predetermined higher second value and the engine is operating within a selected speed range and for maintaining the drive motor continuously energized at all engine speeds while the engine temperature is higher than the predetermined second value, comprising:

energizing circuit means through which said fan drive motor may be energized by the output potential of said dynamoelectric generator;

means for effecting the periodic completion and interruption of said energizing circuit at a predetermined frequency and in such a manner that the ratio of the period of completion of said energizing circuit to the period of interruption of said energizing circuit provides a predetermined drive motor energization duty cycle;

means for producing a potential signal of a magnitude directly proportional to engine speed;

means responsive to said potential signal while the engine temperature is within the range between said predetermined first and second values for extending said drive motor energization duty cycle by an amount directly proportional to engine speed within a selected engine speed range whereby the average supplied drive motor power is directly proportional to engine speed while the engine temperature is within the range between the predetermined first and second values and said engine is operating within said selected speed range;

means responsive to engine temperatures less than said predetermined first value for disabling said means for effecting the periodic completion and interruption of said energizing circuit whereby said drive motor is maintained deenergized; and means responsive to engine temperatures greater than said predetermined second value for overriding the effect of said means for effecting the periodic completion and interruption of said energizing circuit and said means for extending said drive motor energization duty cycle in such a manner as to maintain said drive motor continuously energized at all engine speeds.

4. An internal combustion engine radiator cooling fan drive motor control circuit adaptable for use with a direct current generating system including a dynamoelectric generator driven by the engine for maintaining the drive motor deenergized while the engine temperature is less than a predetermined first value, for effecting drive motor energization in such a manner that the average supplied drive motor power is directly proportional to engine speed while the engine temperature is within a range between the predetermined first value and a predetermined higher second value and the engine is operating within a selected speed range and for maintaining the drive motor continuously energized at all engine speeds while the engine temperature is higher than the predetermined second value, comprising:

energizing circuit means through which said fan drive motor may be energized by the output potential of said dynamoelectric generator;

an oscillator circuit for effecting the periodic completion and interruption of said energizing circuit at a predetermined frequency and in such a manner that the ratio of the period of completion of said energizing circuit to the period of interruption of said energizing circuit provides a predetermined drive motor energization duty cycle;

means for producing a potential signal of a magnitude directly proportional to engine speed;

comparator circuit means responsive to said potential signal while the engine temperature is within the range between said predetermined first and second values for overriding said oscillator circuit in a manner to extend said drive motor energization duty cycle by an amount directly proportional to engine speed within a selected engine speed range whereby the average supplied drive motor power is directly proportional to engine speed while the engine temperature is within the range between the predetermined first and second values and said engine is operating within said selected speed range;

means responsive to engine temperature less than said predetermined first value for disabling said oscillator whereby said drive motor is maintained deenergized; and means responsive to engine temperature greater than said predetermined second value for overriding the effect of said oscillator circuit and said comparator circuit in such a manner as to maintain said drive motor continuously energized at all engine speeds.

5. An internal combustion engine radiator cooling fan drive motor control circuit adaptable for use with a direct current generating system including a dynamoelectric generator driven by the engine for maintaining the drive motor deenergized while the engine temperature is less than a predetermined first value, for effecting drive motor energization in such a manner that the average supplied drive motor power is directly proportional to engine speed while the engine temperature is within a range between the predetermined first value and a predetermined higher second value and the engine is operating within a selected speed range and for maintaining the drive motor continuously energized at all engine speeds while the engine temperature is higher than the predetermined second value, comprising:

energizing circuit means including a drive transistor and a switching transistor arranged to be rendered conductive by said drive transistor while said drive transistor is conductive through which said fan drive motor may be energized by the output potential of said dynamoelectric generator;

an oscillator circuit arranged to periodically render said drive transistor conductive and not conductive for effecting the periodic completion and interruption of said energizing circuit at a predetermined frequency and in such a manner that the ratio of the period of completion of said energizing circuit to the period of interruption of said energizing circuit provides a predetermined drive motor energization duty cycle;

means for producing a potential signal of a magnitude directly proportional to engine speed;

a comparator circuit responsive to said potential signal while the engine temperature is within the range between said predetermined first and second values for extending said drive motor energization duty cycle by an amount directly proportional to engine speed within a selected engine speed range whereby the average supplied drive motor power is directly proportional to engine speed while the engine temperature is within the range between the predetermined first and second values and said engine is operating within said selected speed range;

means responsive to engine temperature less than said predetermined first value for disabling said oscillator circuit whereby said drive motor is maintained deenergized; and means responsive to engine temperature greater than said predetermined second value for overriding the effect of said oscillator circuit to maintain said drive transistor conductive to maintain said drive motor continuously energized at all engine speeds.

* * * * *